US012512041B1

(12) United States Patent
Chalmers et al.

(10) Patent No.: US 12,512,041 B1

(45) Date of Patent: Dec. 30, 2025

(54) APPARATUSES, SYSTEMS, AND METHODS FOR MICROLED (mLED) BACKPLANE ARCHITECTURES

(71) Applicant: FORTH DIMENSION DISPLAYS LTD., Dalgety Bay (GB)

(72) Inventors: Christopher Robert Chalmers, Dunfermline (GB); Mladen Panovic, Cambridge (GB); Debra Jane Lefley, Cirencester (GB); Gordon John Faulds, Dursley (GB); Jason Darren Drew, Bristol (GB); Jedrzej Nowakowski, Tuchom (PL); Mark Newsam, Peebles (GB); Neil Mallory, Yaxley (GB); Robert Charles Beat, Bristol (GB); Robert Arthur Creber, Bristol (GB); Ruiyan Zhao, Swindon (GB)

(73) Assignee: FORTH DIMENSION DISPLAY, LTD, Dalgety Bay (GB)

( * ) Notice: Subject to any disclaimer, the term of this patent is extended or adjusted under 35 U.S.C. 154(b) by 0 days.

(21) Appl. No.: 18/626,097

(22) Filed: Apr. 3, 2024

Related U.S. Application Data

(62) Division of application No. 17/705,088, filed on Mar. 25, 2022, now Pat. No. 11,955,059.

(60) Provisional application No. 63/166,758, filed on Mar. 26, 2021.

(51) Int. Cl.
*G09G 3/32* (2016.01)
*G09G 3/20* (2006.01)

(52) U.S. Cl.
CPC ............. *G09G 3/32* (2013.01); *G09G 3/2074* (2013.01); *G09G 3/2018* (2013.01); *G09G 2300/0842* (2013.01); *G09G 2310/0251* (2013.01); *G09G 2310/08* (2013.01); *G09G 2320/0233* (2013.01); *G09G 2320/0276* (2013.01)

(58) Field of Classification Search
CPC .............. G09G 2300/0452; G09G 2320/0271; G09G 2320/0233; G09G 2320/0276; G09G 3/2003; G09G 3/20; G09G 3/2927; G09G 3/2074; G09G 3/2085; G09G 2360/16; G09G 2310/0251
See application file for complete search history.

(56) References Cited

U.S. PATENT DOCUMENTS 6,734,875 B1 * 5/2004 Tokimoto ................. G09G 3/32 345/82
2001/0052606 A1 12/2001 Sempel
2011/0043546 A1 2/2011 Matsumoto
(Continued)

OTHER PUBLICATIONS

PCT Search Report PCT/IB2022/000186, Oct. 25, 2022 (5 pages).
PCT Written Opinion PCT/IB2022/000186, Oct. 25, 2022 (9 pages).

*Primary Examiner* — Dong Hui Liang
(74) *Attorney, Agent, or Firm* — PELOQUIN, PLLC; Mark S. Peloquin, Esq.

(57) ABSTRACT

Method, apparatuses, and systems are described to display image data to a sub-pixel within a micro-LED (mLED) display. A sub-pixel image data value is stored at the sub-pixel. The sub-pixel is turned to an ON state. A shared row counter value is provided to the sub-pixel. The shared row counter value and the sub-pixel image data value are compared at the sub-pixel. The sub-pixel is turned to an OFF state if the shared row counter value is equal to or greater than the sub-pixel image data value.

2 Claims, 16 Drawing Sheets

(56) References Cited

U.S. PATENT DOCUMENTS

| | | | | |
|---|---|---|---|---|
| 2011/0109233 | A1 | 5/2011 | Wang | |
| 2011/0122119 | A1 | 5/2011 | Bae | |
| 2013/0082615 | A1 | 4/2013 | Williams | |
| 2013/0114782 | A1 | 5/2013 | Nagano | |
| 2014/0368415 | A1 | 12/2014 | Kim | |
| 2015/0187273 | A1 | 7/2015 | Chang | |
| 2017/0186356 | A1 | 6/2017 | Cok | |
| 2018/0182279 | A1* | 6/2018 | Sakariya .............. | G09G 3/2088 |

* cited by examiner

APPARATUSES, SYSTEMS, AND METHODS FOR MICROLED (mLED) BACKPLANE ARCHITECTURES

RELATED APPLICATIONS

This patent Application is a Divisional of U.S. patent application Ser. No. 17/705,088, titled “APPARATUSES, SYSTEMS, AND METHODS FOR MicroLED (mLED) BACKPLANE ARCHITECTURE,” filed on Mar. 25, 2022, which is a Non-Provisional of U.S. Provisional Patent Application Ser. No. 63/166,758, titled “APPARATUSES, SYSTEMS, AND METHODS FOR MicroLED BACKPLANE ARCHITECTURE,” filed on Mar. 26, 2021. U.S. patent application Ser. No. 17/705,088 is hereby incorporated by reference. U.S. Patent Application Ser. No. 63/166,758 is hereby incorporated by reference.

BACKGROUND OF THE INVENTION

1. Field of the Invention

The invention relates generally to micro displays and more specifically to improving image fidelity and luminance control in MicroLED displays.

2. Art Background

Micro-displays are used in a variety of products such as wearable devices. Often wearable devices are used outdoors in bright natural light conditions. Bright natural light conditions are challenging for existing micro-displays. Often such micro-displays are not bright enough to permit a user to see the images displayed thereon. This can present problems.

Traditional binary pulse width modulation (PW) techniques allow an efficient transistor count inside sub-pixels of a micro-display, however the traditional techniques struggle with image artefacts at high illumination duty cycles, such as, but not limited to dynamic false contouring (DFC) caused by sequential weighted bit-plane illumination. Single pulse techniques have traditionally suffered from a lack of accuracy (analogue comparator) or high transistor counts (Digital Comparator). This can present problems.

LEDs are, ideally, current driven devices. The sharp current/voltage (IV) characteristic of LEDs means small changes in voltage can result in large changes in current. This means that the voltage driving of LEDs can be challenging. This can present problems.

Current sources are often preferred for driving LEDs, but when many current sources are used to drive many LEDs, then current mismatch is likely to occur between the LEDs. The source of the current mismatch is the threshold variation in the Field Effect Transistors (FETs) used in the current source. If a constant voltage is applied to a FET’s gate, then a FET with a lower voltage threshold allows more current to pass through it for the same constant voltage. A higher threshold voltage FET will pass less current for the same constant voltage. The cause of the mismatch is due to variations that arise during fabrication. This can present problems.

In a MicroLED micro-display application, current sources may be used to drive a pixel in the display. Pixel-to-Pixel voltage threshold mismatch translates into differing amounts of luminance across the display. This contributes to non-uniformity in the displayed image and a poorer representation of the required image. It would not be uncommon to expect to see uniformity across an image of around 70 to 80% in an existing micro-display where nothing has been done to compensate for this effect. This can present a problem.

MicroLEDs, like traditional LEDs, contain parasitic capacitance. This capacitance needs to be charged up to the forward voltage of the LED to allow current to pass. In low luminance applications, a combination of small pulse width modulation and low driving current is commonly used to achieve the desired light output. However, this combination of small pulses and low driving current have difficulty, when combined, in overcoming the parasitic capacitance inside the mLED. This can present problems.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense.

In various embodiments, apparatuses, methods, and systems are described for improving image fidelity and precise control of luminance in MicroLED (mLED) displays as described below. One or more or all of the techniques, described below, are utilized in a mLED display according to embodiments of the invention.

In various embodiments, systems, apparatuses, and methods are taught that enable mLEDs to provide benefits, such as, but not limited to, high brightness and long lifetimes when compared with other existing micro-display technologies. To take advantage of this luminance, in various embodiments, mLED micro-displays maximize the application of current and show the imagery at a high duty cycle.

Sub-Pixel Digital Comparator with Shared Pulse Width Row Counter

In various embodiments, the mLED backplane architectures, described herein, provide high brightness, accurate grey level reproduction across all luminance levels and excellent image quality. In various embodiments, a digital comparator is implemented in the sub-pixel. As used in this description of embodiments, the term "grey level" refers to a particular color of light emitted from a micro-light emitting diode (mLED), such as but not limited to; red, blue, green, amber, white, etc.

Figure 1A:
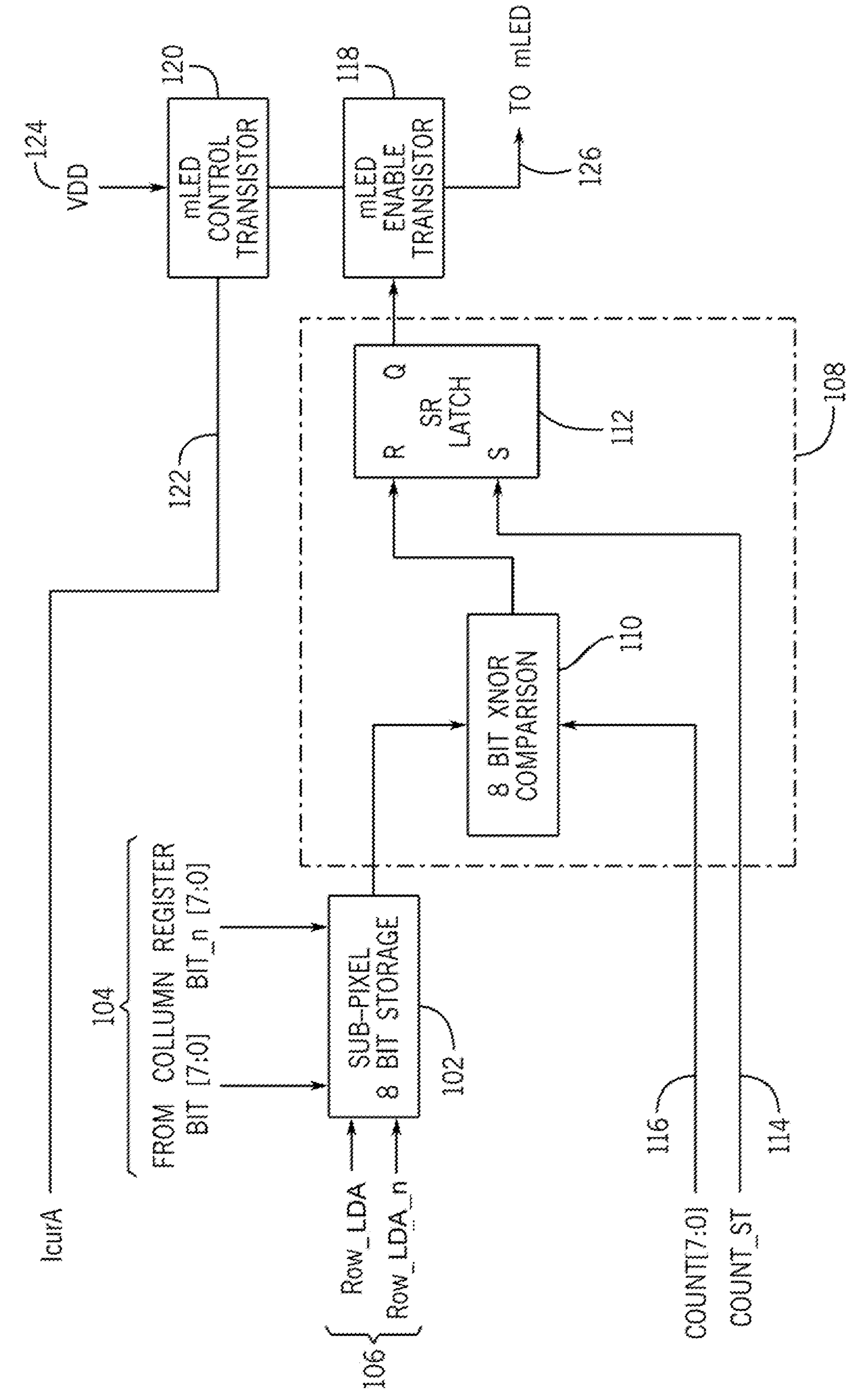
FIG. 1A illustrates a shared row counter operating a sub-pixel, according to embodiments of the invention.

FIG. 1A illustrates, generally at 100, a sub-pixel architecture, according to embodiments of the invention. With reference to FIG. 1A, an example of a sub-pixel architecture is given using eight bits as an example for the depth of sub-pixel image data. No limitation is implied thereby, 8 bits is given merely for illustration and image data having more than eight bits or less than eight bits is readily accommodated in embodiments of the invention.

In operation, sub-pixel image data is loaded via column lines 104 and row lines 106 into a sub-pixel storage element 102. A sub-pixel control block 108 contains a comparator 110, device 112, shared row counter signal lines 114 and 116. An output of the sub-pixel control block 108 operates a sub-pixel mLED enable transistor 118. A mLED control transistor 120 receives power provided with a supply voltage 124 and a source of current 122. An output of the mLED control transistor 120 is coupled to an input of the mLED enable transistor 118. An output 126 of the mLED enable transistor is coupled to the sub-pixel mLED (not shown).

In some embodiments the device 112 is an SR latch and the comparator 110 is a digital comparator. The non-limiting example of operation given here is provided merely for illustration and does not limit embodiments of the invention. In other embodiments different structural elements are used. The sub-pixel control block 108 provides two states of operation, an ON state and an OFF state. Displaying a new line of image data commences with an ON-state signal on line 114 going high. A high signal on line 114 sets SR latch 112 which turns the mLED enable transistor 118 ON thereby providing current to the sub-pixel mLED via 126. A shared row counter is distributed to all of the sub-pixels on a row via Line 116. At comparator 110 the stored sub-pixel data value from 102 is compared with a shared row counter value from line 116. When the shared row counter value 116 matches the stored sub-pixel data value from 102 the sub-pixel control block 108 initiates an OFF state. In some embodiments, the Off state is initiated when the shared row counter value is greater than the sub-pixel data value.

In one or more embodiments, a "sub-pixel counter" is removed and instead a shared row counter is used which distributes a count value 116 across a row of sub-pixels of a mLED display. These new circuit structures, that have removed the sub-pixel counter, are implemented to reduce the high transistor count requirements for the mLED display. The grey level to be shown is stored in each sub-pixel, for example at 102, and then compared at 110 to the incrementing row count value on line 116. In some embodiments, when the stored value from 102 and counter value from 116 match then the mLED is switched off at 118. If the stored value is 0 then the mLED is never switched on.

The removal of the sub-pixel counter from each sub-pixel reduces the number of transistors required to around a half of what is normally needed. With a sub-90 nanometers (nm) process node for example, it is then possible to fit a digital comparator implementation with mLED drive circuitry within a 4.6 micrometer (um) sub-pixel.

With a fast clock incrementing the shared row counter, extremely small mLED pulses can be created which provide precise grey level control at small luminance levels as well as allowing a high duty cycle.

Figure 1B:
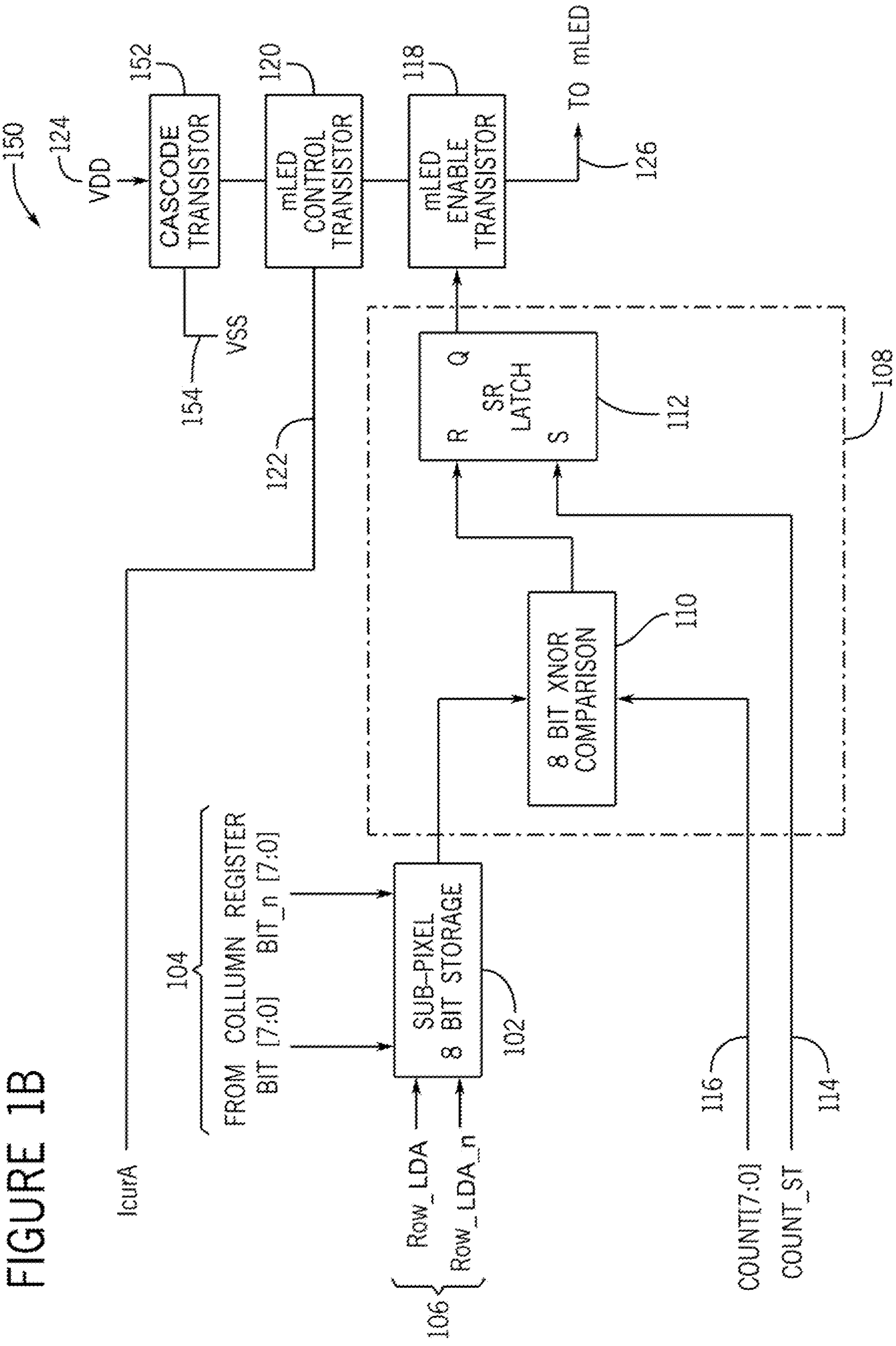
FIG. 1B illustrates another sub-pixel architecture, according to embodiments of the invention.

FIG. 1B illustrates, generally at 150, another sub-pixel architecture, according to embodiments of the invention. With reference to FIG. 1B, a cascode transistor 152 connected to the supply voltage 124 and a ground potential 154 is placed as shown relative to the mLED enable transistor 120. The cascode transistor 152 improves rejection of noise on the power supply.

In some embodiments, there can be a cascode transistor between the mLED control transistor 120 and mLED enable transistor 118 to improve rejection of noise on the power supply.

In some embodiments, the digital comparator 110 can be a combination of an analog and digital comparator to save space.

In some embodiments, the pixel grey level counter can be a Gray code encoded to minimize signal transitions. In such an implementation, video data would need to be Gray level encoded also.

In some embodiments, gamma correction can be encoded into the row counter by adjusting the frequency at which the counter increments so that lower sub-pixel grey levels are incremented faster as compared to higher grey levels. As described herein with respect to FIG. 5 below, a frequency at which the pixel_ramp counter 518 increments is increased for lower grey levels (e.g., grey level 1) and the frequency is decreased for higher grey levels (e.g. grey level 255). Thus, increasing the frequency at which the pixel_ramp counter 518 increments provides a smaller PWM pulse out and less illumination from the lower grey levels. Slowing the frequency at which the pixel_ramp counter 518 increments provides a longer PWM pulse out and more illumination from the upper grey levels.

In some embodiments, the shared row counter doesn't have to be outside of the sub-pixel. For example, a shared row counter can be inside of one of the sub-pixels in a row of sub-pixels of a mLED display.

Figure 2:
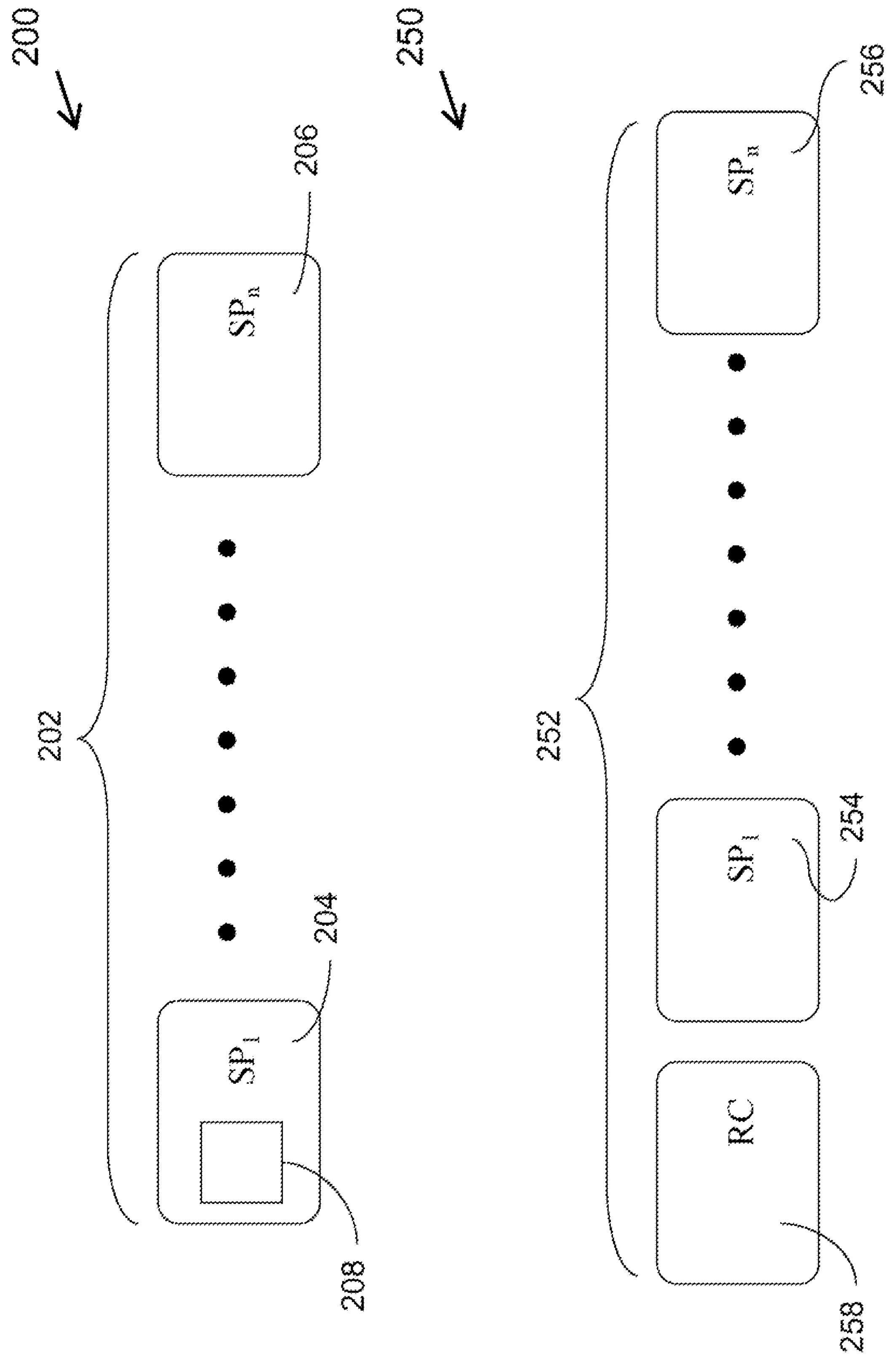
FIG. 2 illustrates shared row counter placement, according to embodiments of the invention.

FIG. 2 illustrates shared row counter placement, according to embodiments of the invention. With reference to FIG. 2, a row having a general number of n sub-pixels of a mLED display is illustrated at 202. A first sub-pixel in the row 202 is indicated at 204 up to the $n^{th}$ sub-pixel at 206. A shared row counter 208 is located with the first sub-pixel 204. In various embodiments, alternatively the shared row counter 208 can be located with any of the sub-pixels in the row 202.

Alternative placement of the shared row counter is illustrated at 250 in FIG. 2. A row having a general number of n sub-pixels of a mLED display is illustrated at 252. A first sub-pixel in the row 252 is indicated at 254 up to the $n^{th}$ sub-pixel at 256. A shared row counter 258 is located separately from the first sub-pixel 254. Thus, in various embodiments, a shared row counter can be located in a variety of locations with respect to a layout of a row of sub-pixels in a mLED display.

Single Pulse Width Modulation with Row Based Precise Control

In various embodiments, grey level control of the MicroLED image is achieved by using pulse width modulation. Lower grey levels are 'on' for less time than higher grey levels. Each mLED is illuminated for a single pulse time i.e., the mLED stays on for a length of time equivalent to the grey level required.

Figure 3:
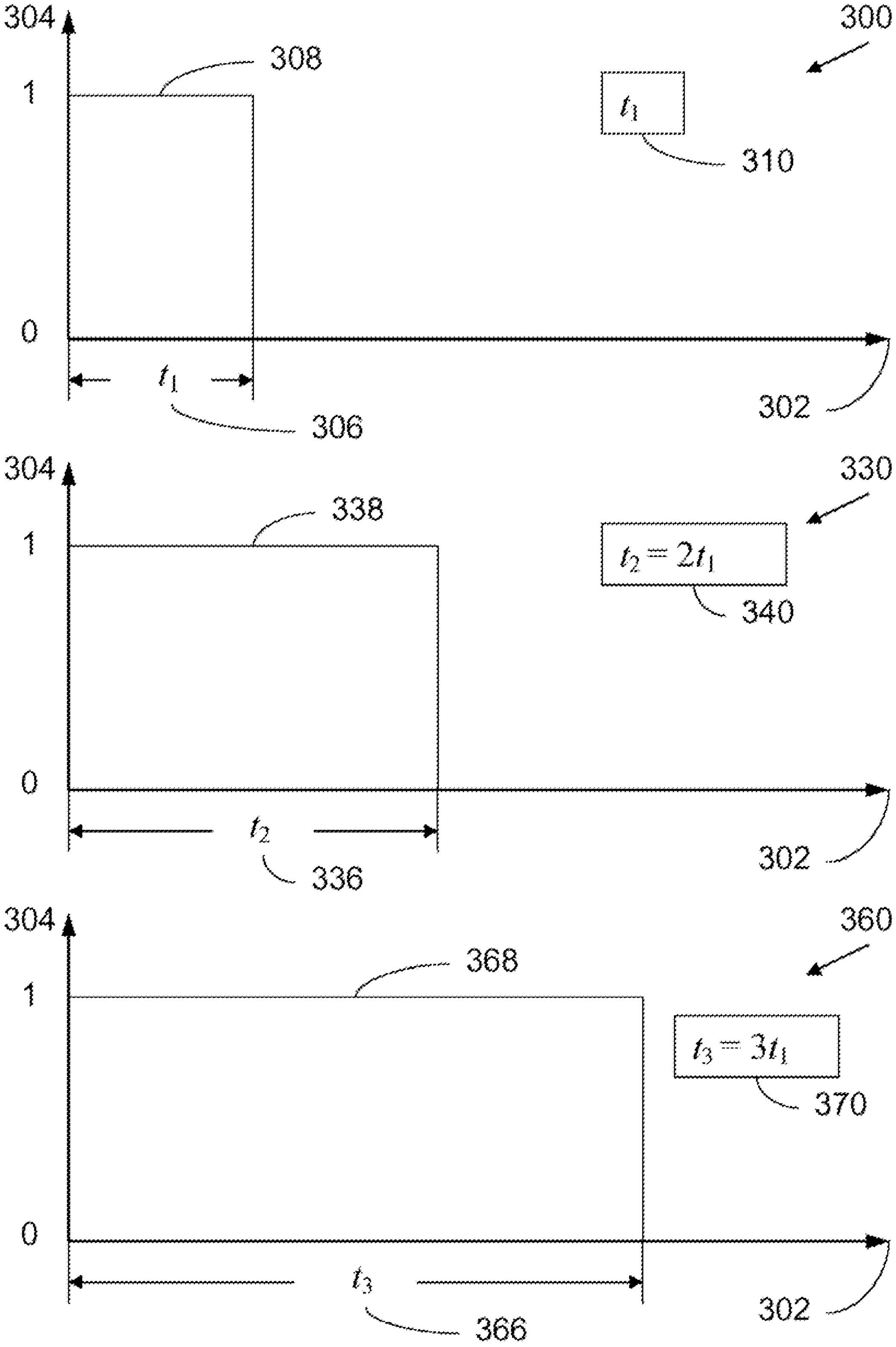
FIG. 3 illustrates several ON-time periods for a sub-pixel, according to embodiments of the invention.

FIG. 3 illustrates several ON-time periods for a sub-pixel, according to embodiments of the invention. With reference to FIG. 3, time is displayed on a horizontal axis 302 and pixel state is indicated on a vertical axis 304 with zero (0) indicating the OFF state, no emission of light, and a one (1) indicating the ON state where emission of light occurs.

A grey level 1 is indicated at 310 with associated time duration $t_1$. Time duration $t_1$ is plotted as 306 and 308 in 300. This is the minimum illumination value for a sub-pixel of a mLED display when operated with this illumination value 308 the sub-pixel mLED will stay illuminated for time $t_1$.

A grey level 2 is indicated at 340 with associated time duration $t_2$. Time duration $t_2$ is plotted as 336 and 338 in 330. Grey level 2 is on for double the amount of time of grey level 1 as illustrated in the equation at 340.

A grey level 3 is indicated at 370 with associated time duration $t_3$. Time duration $t_3$ is plotted as 366 and 368 in 360. Thus, grey level 3 is on for three times the time of grey level 1 and so on. These grey levels represent the luminance of a sub-pixel in the video image to be shown on the mLED display.

The 'ON' time of the grey levels can be increased overall by scaling them in proportion. This will result in an overall increase in mLED luminance and a brighter image. For example, if the lowest non-zero grey level 310 'on pulse time' was 1 microsecond and the highest grey level was on for 255 microseconds then to increase the luminance the lowest non-zero grey level 310 is switched on for 10 microseconds and the highest for 2550 microseconds.

Figure 4:
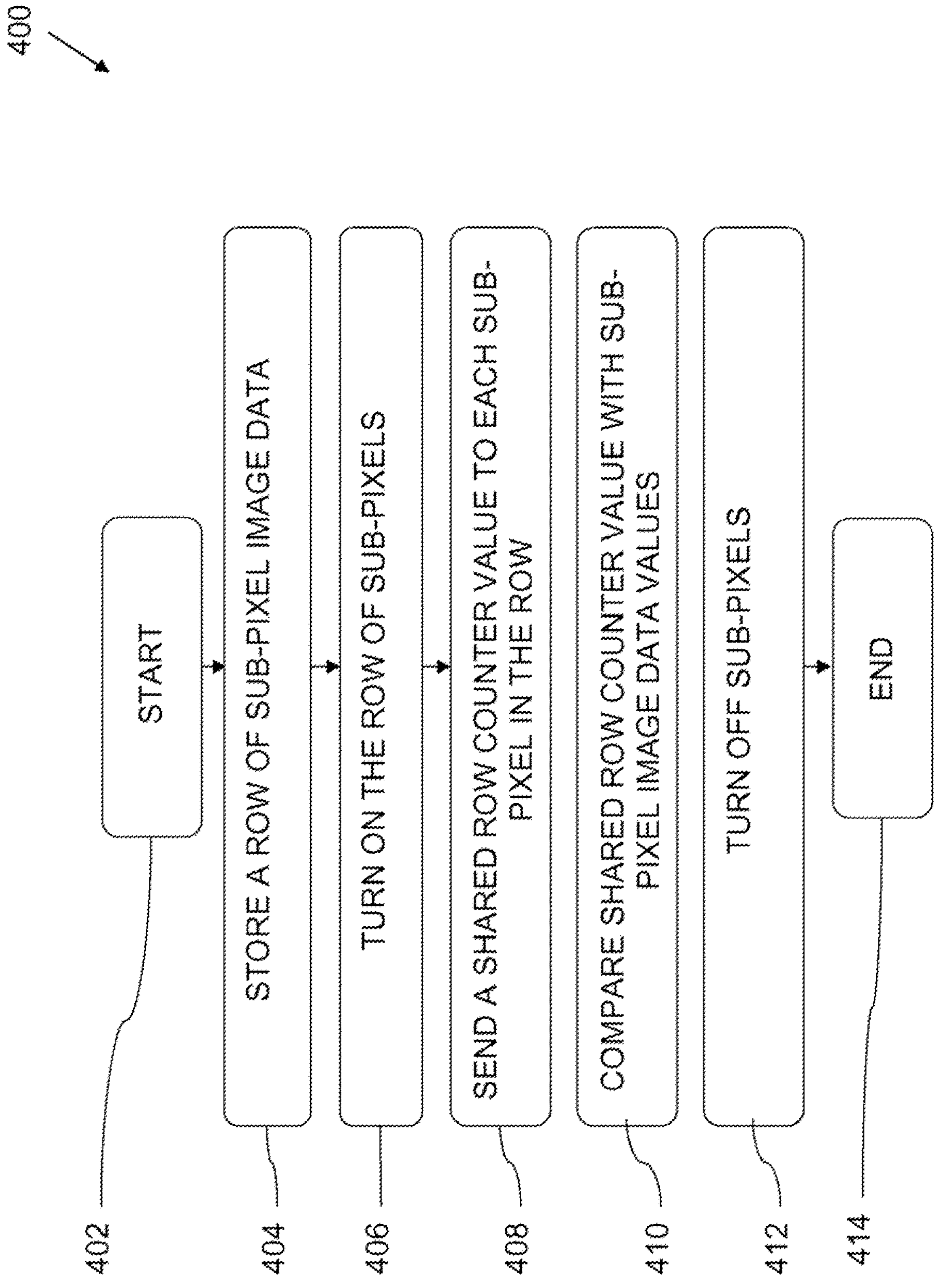
FIG. 4 illustrates a method to operate a row of sub-pixels in a micro-LED (mLED) display, according to embodiments of the invention.

FIG. 4 illustrates, generally at 400, a method to operate a row of sub-pixels in a micro-LED (mLED) display, according to embodiments of the invention. With reference to FIG. 4, a process commences at a block 402. At a block 404 a row of sub-pixel image data is stored in a row of the mLED display. The process described above in conjunction with FIG. 1A is replicated at each sub-pixel in the row of the mLED display. For example, each sub-pixel of the row has a storage location and is configured to receive image data for its particular sub-pixel location.

At a block 406 the row of sub-pixels is turned to an ON state. As described above in conjunction with FIG. 1A, the line 114 is coupled to each sub-pixel in the row. When the signal goes high, on the 114 line, each of the respective sub-pixel mLED control blocks initiates the ON state thereby turning on the row of sub-pixels in the mLED display.

At a block 408 a shared row counter value is sent to each sub-pixel in the row of sub-pixels. Line 116, from the shared row counter, is connected to the sub-pixels in the row of sub-pixels as illustrated for a sub-pixel in FIG. 1A.

At a block 410 sub-pixel image data values are compared with a value from the shared row counter. This comparison occurs at each sub-pixel in the row. Each of the respective sub-pixel mLED control blocks initiates the OFF state 412 thereby turning OFF sub-pixels when a stored sub-pixel data value matches a shared row counter data value. As described above, in various embodiments, the logical condition implemented within the sub-pixels to initiate an OFF state can be when the shared row counter value is equal to or greater than the stored sub-pixel image data value 412. The process for displaying a row of sub-pixel data ends at a block 414.

Note that the process described above is replicated at each row of a mLED display thereby providing for the display of an entire frame of image data.

Figure 5:
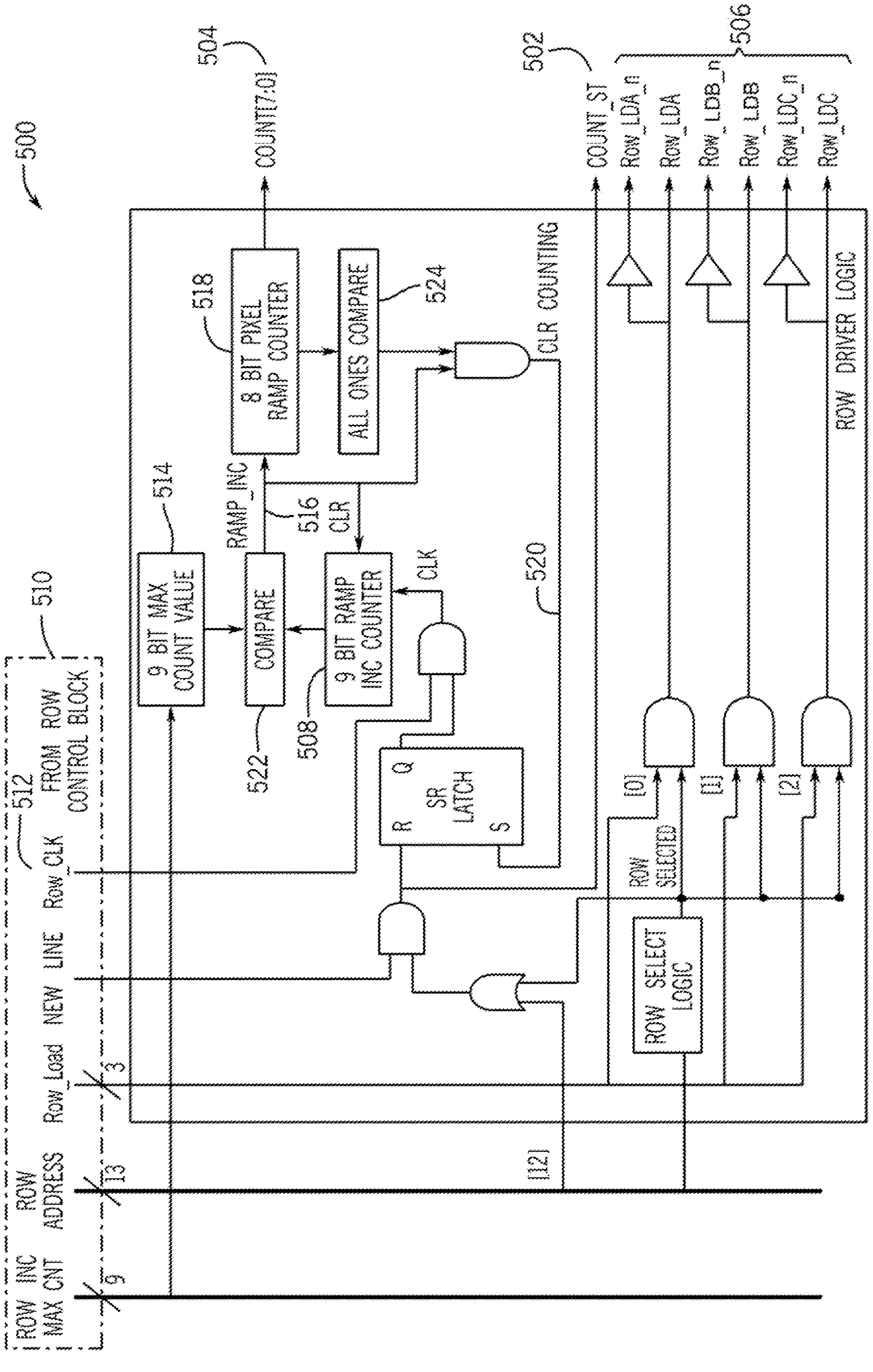
FIG. 5 illustrates an illumination period counter, according to embodiments of the invention.

FIG. 5 illustrates, generally at 500, an illumination period counter, according to embodiments of the invention. With reference to FIG. 5, the row driver circuit described contains an illumination period counter circuit that drives a single row of the display at a time. In a non-limiting example, provided only for illustration and with no limitation implied thereby, the basic operation of the circuit shown in FIG. 5 is described below.

At the start of an illumination period, the row circuitry pulses the COUNT_ST signal 502 to indicate to a row of sub-pixels that the illumination period is going to start. The sub-pixels in the row respond by switching on their mLEDs. If the grey level to be shown in a sub-pixel is 0 then its mLED is never switched on.

Next, a first counter indicated in FIG. 5 as 'ramp inc' counter at 508 is started which is clocked by a frequency selectable by parameter row_clock at 512. This first counter 508 continues counting until it reaches the value stored in the max_count value at 514. The value in the max count value 514 can be but is not restricted to be set from a control register or something similar associated with the mLED display. When the counter value of the first counter 508 matches the value stored at 514, a "Compare" 522 outputs a pulse at 516 which increments by 1 a second counter indicated as pixel_ramp_counter at 518. The pixel_ramp_counter 518 outputs its count value at 504. The signal output on 504 is the shared row count value that is sent to all of the sub-pixels in a row of the mLED display. When the "All ones compare" 524 is true and the pulse at 516 is true then the ramp_inc counter 508 is then reset via 520 and begins counting again. The pixel ramp counter 518 will continue to count up to 255 representing the grey levels in this example of sub-pixel image data 8 bits deep. The sub-pixels within the row will switch off their mLEDs when the pixel_ramp_counter value matches an internally stored grey value of a given sub-pixel.

Note that this architecture provides two ways to affect the rate at which the pixel_ramp_counter 508 increments and thus for how long an mLED pulse will stay on for. These two ways are: (1) adjustment of the row_clk frequency 512; and (2) adjustment of the max_count value 514.

In various embodiments, a control register on die allows a user to select the row_clk frequency 512 at which to clock the ramp_inc counter 508. This clock is derived from the incoming video clock and the register allows the user to select a divide down value and ultimately the frequency used to clock the counter row_clk at 512. Adjusting row_clk frequency at 512 provides a coarse control of the illumination period for sub-pixels.

In various embodiments, another control register allows the user to control the max_cnt value 514 for the row illumination circuitry. The non-limiting example provided in FIG. 5 used 9 bits to provide 512 settings of brightness as indicated at 514. Adjustment of the max_cnt value parameter at 514 provides a fine control of the global display brightness. In various embodiments, a display is configured with multiple sub-pixels in a given row in order to provide a range of color at each pixel location. Where a pixel is made with one or more sub-pixels. For example; red, green, blue sub-pixels are driven by row lines 506 to provide full color pixels to a mLED display.

Figure 6:
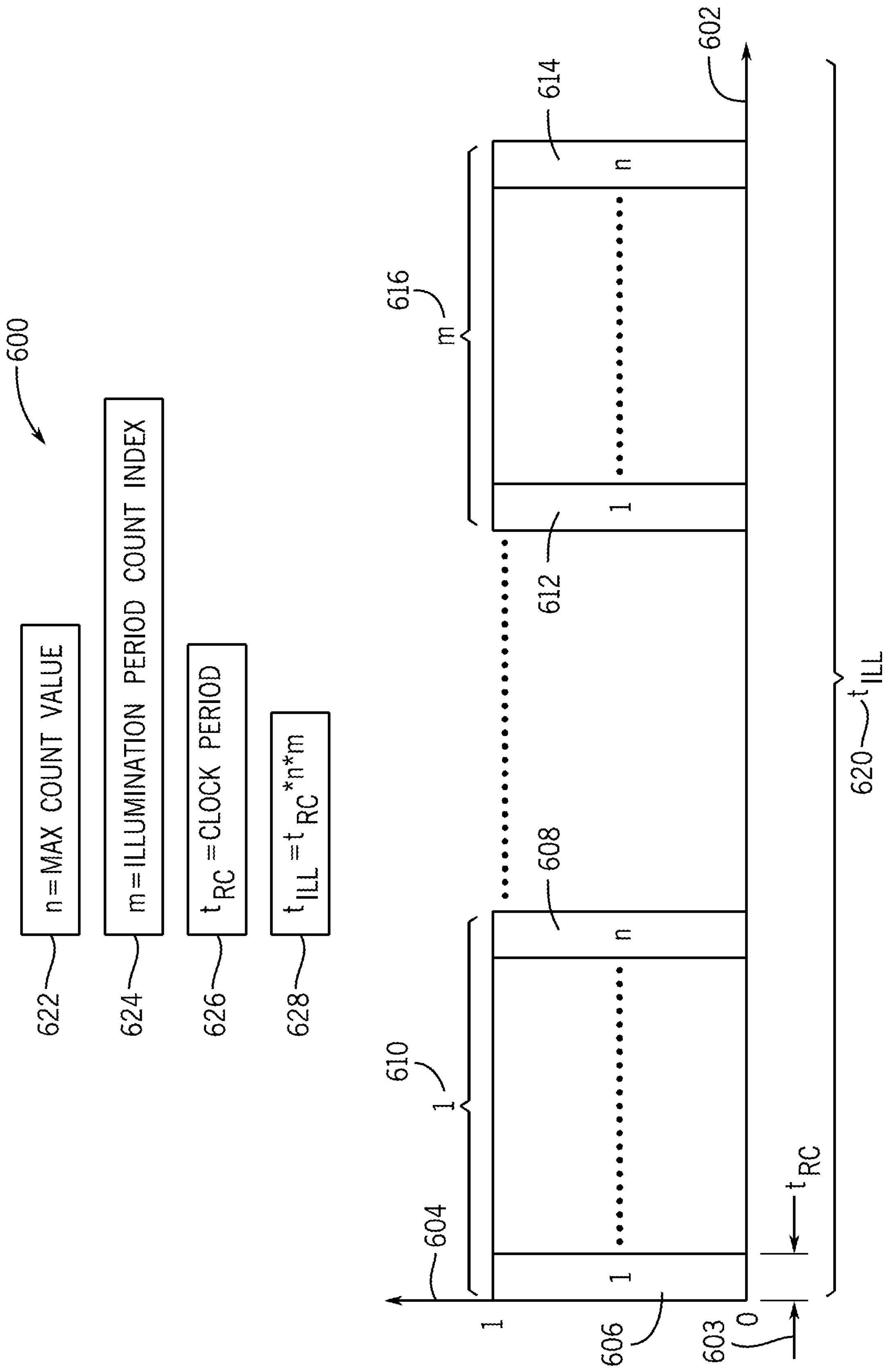
FIG. 6 illustrates an illumination period, according to embodiments of the invention.

FIG. 6 illustrates, generally at 600, an illumination period, according to embodiments of the invention. With reference to FIG. 6, an illumination period $t_{LL}$ is illustrated using a horizontal axis 602 for time and a vertical axis 604 to illustrate the two states of mLED operation, i.e., an OFF state at zero 0 and an ON state at 1. As described above, an illumination period signal is constructed using a first counter and a second counter where the minimum time increment is established by a clock period $t_{rc}$ indicated graphically at 603 and defined at 626 as the clock period, i.e., the period of the row_clk frequency 512. As described above, the first counter is triggered by the row_clk frequency 512 where a first count value of the first counter 508 is indicated at 606. The first counter proceeds up to to a max_count_value indicated by n at 608, where an output at 516 (FIG. 5) advances a second counter 518 by one indicated at 610 (FIG. 6). The second counter index is represented by variable m at 624. The process continues up to m times as indicated at 616. Note that m takes on values set by a predetermined quantization of the sub-pixel image data. In the example of FIG. 5, m takes on values ranging from 1 to 255 for 8-bit deep sub-pixel image data providing 255 illumination states with 0 representing no illumination or black. The $m^{th}$ output from the second counter is indicated at 616. An illumination period for the $m^{th}$ output of the second counter is indicated at 620. The illumination period $t_{LL}$ is the time that a sub-pixel remains in the ON state emitting light. An equation for $t_{LL}$ is given at 628.

Figure 7:
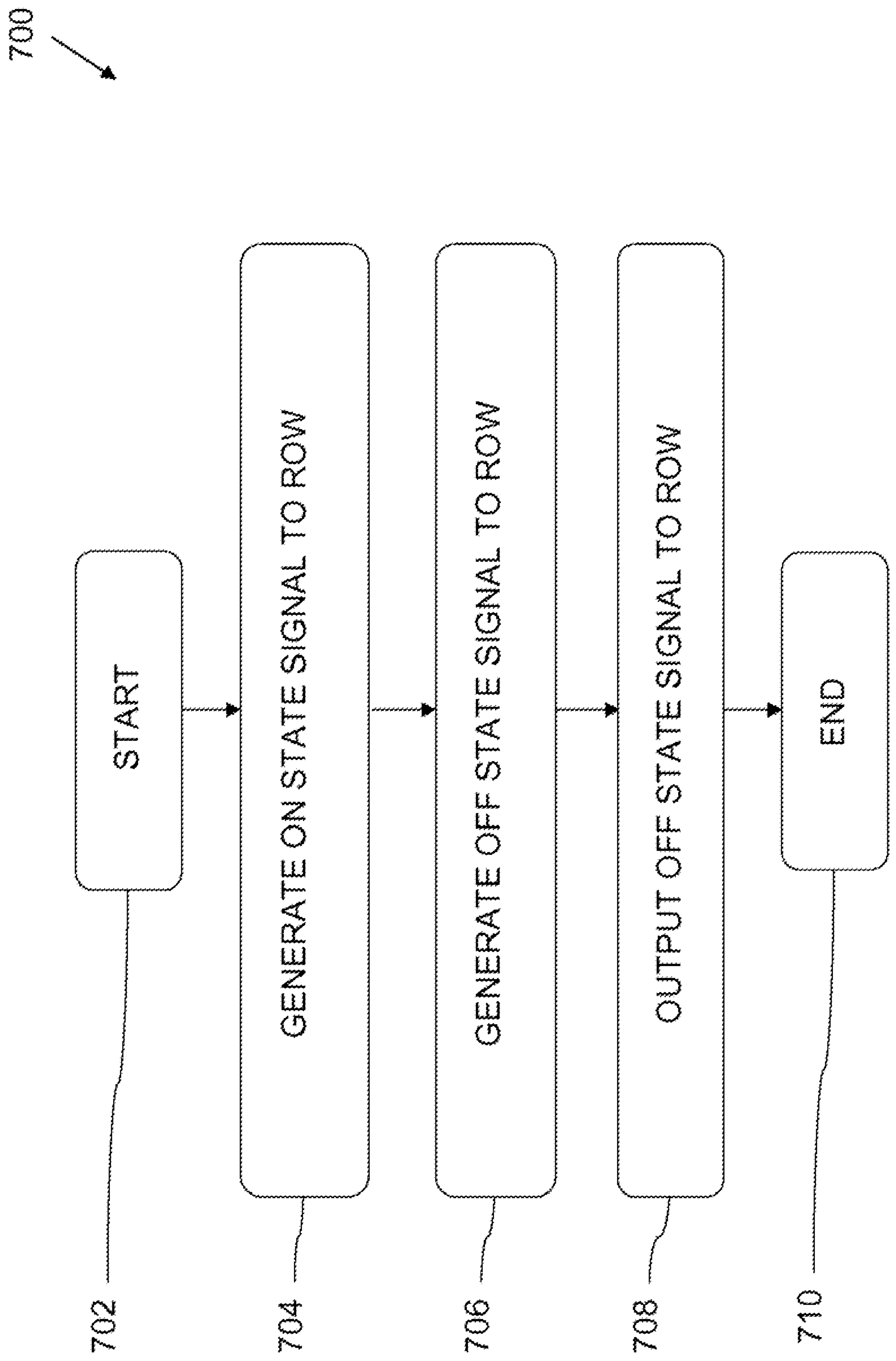
FIG. 7 illustrates a method of row-based illumination period counter operation, according to embodiments of the invention.

FIG. 7 illustrates, generally at 700, a method of row-based illumination period counter operation, according to embodiments of the invention. With reference to FIG. 7, a process starts at a block 702. At a block 704 an ON-state control signal is generated and sent to a row of mLED sub-pixels of a mLED display. As previously described a line such as 114 (FIG. 1A) or a line 502 with the signal in a high state, e.g., a 1 state are examples. Such an ON-state signal sent to sub-pixels in a row initiate the ON state for the sub-pixels in the row with emission of light from the sub-pixels. At a block 706 an OFF-state signal is generated and is sent to the sub-pixels in the row of the mLED display. The generation of an illumination period signal as described above in conjunction with the previous figures, e.g., a first counter and a second counter, are examples of operation of the block 706. At a block 708 the OFF-state signal is output to the sub-pixels in the row of the mLED display. Signals output onto line 116 (FIG. 1A) and 504 (FIG. 5) are examples of OFF-state signals output to the sub-pixels in the row of the mLED display. Triggering an OFF state at an individual sub-pixel mLED in the row occurs when the stored data value at the sub-pixel mLED matches the OFF-state signal on line 116 (FIG. 1A) or line 504 (FIG. 5). In various embodiments, the OFF state is triggered in the sub-pixel mLED when the OFF-state signal on line 116 (FIG. 1A) or line 504 (FIG. 5) is equal to or greater than the stored data value at the sub-pixel mLED. The process stops at a block 710. Note that, as described above, the process described in FIG. 7 occurs in parallel at all of the rows in an mLED display thereby displaying frame-after-frame of sub-pixel image data to the mLED display.

Pixel to Pixel Compensation Using a Dynamic Current Mirror

Figure 8A:
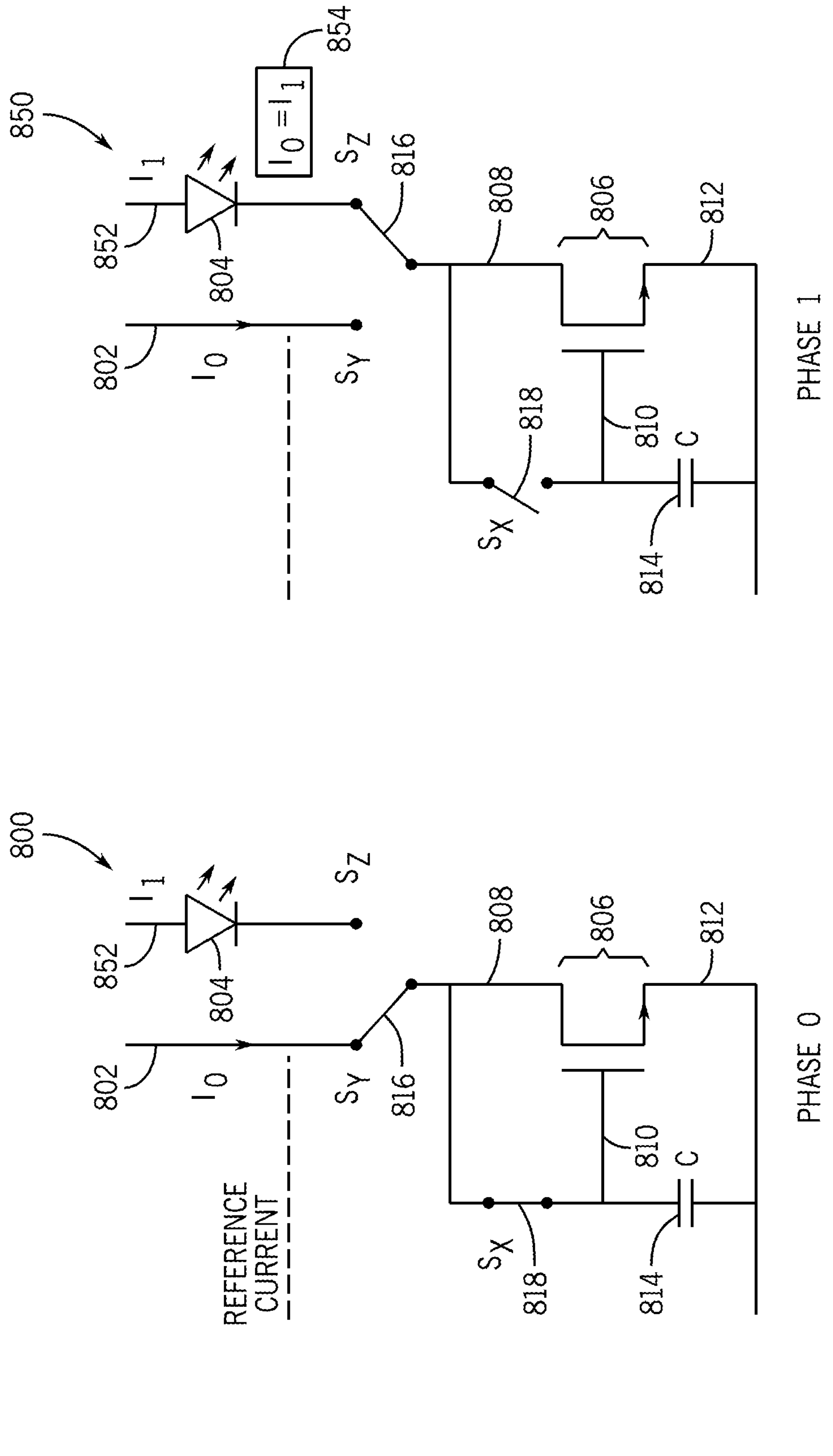
FIG. 8A illustrates dynamic current mirror operation, according to embodiments of the invention.

FIG. 8A illustrates dynamic current mirror operation, Phase 0 at 800 and Phase 1 at 850, according to embodiments of the invention. With reference to FIG. 8A, a current control circuit includes a current control transistor 806. The current control transistor 806 has a drain 808, a gate 810, and a source 812. A capacitor 814 is connected between the gate 810 and the source 812. In Phase 0 a first switch 816 is operable to connect a reference current $I_o$ from a line 802 to the drain 808 of the transistor 806. A second switch 818 is configured between the drain 808 and the gate 810 of the transistor 806. In operation the two switches 816 and 818 are operable to provide two phases of operation of the dynamic current mirror, i.e., phase zero (0) and phase one (1), both of which are described below.

In various embodiments, the problems with driving existing mLEDs are overcome by using a dynamic current mirror at the sub-pixel level to set the required current $I_1$ through the mLED control transistor that is necessary to achieve full mLED brightness in the ON state. By using a series of switches, 816 and 818, the mLED control transistor 806 is first setup in diode mode in 800, this is designated as "Phase 0." The exact gate source voltage, with the transistor threshold voltage compensated for, needed to pass a required reference current $I_o$ at 802 is developed and stored in a capacitor 814. Once stable, the switches 816 and 818, also referred to as in-pixel switches, are switched to Phase 1, disconnecting the dynamic current mirror and connecting the drain 808 of the mLED control transistor 806 to the mLED 804 as shown at 850. With the required gate source voltage held on the capacitor 814, by disconnecting the drain 808 from the gate 810 via switch 818 which is set to pass the required current $I_o$ as shown in 850, the mLED is operated at full brightness with no reduction in brightness because of potentially different transistor threshold values among sub-pixels. The individual transistor threshold value has been accounted for during the charging of capacitor 814 in Phase 0 with the reference current I $I_o$ applied to the transistor 806 in diode mode.

In various embodiments, the component parts that allow this circuit to function to compensate for transistor threshold mismatch are: (a) Digital-to-Analog Converter (D/A) to generate the required mLED reference current $I_o$ available at 802; (b) current mirrors distributed to each sub-pixel, (c) calibration of column current distribution drivers, (d) switches 816 and 818, and storage capacitor 814.

Figure 8B:
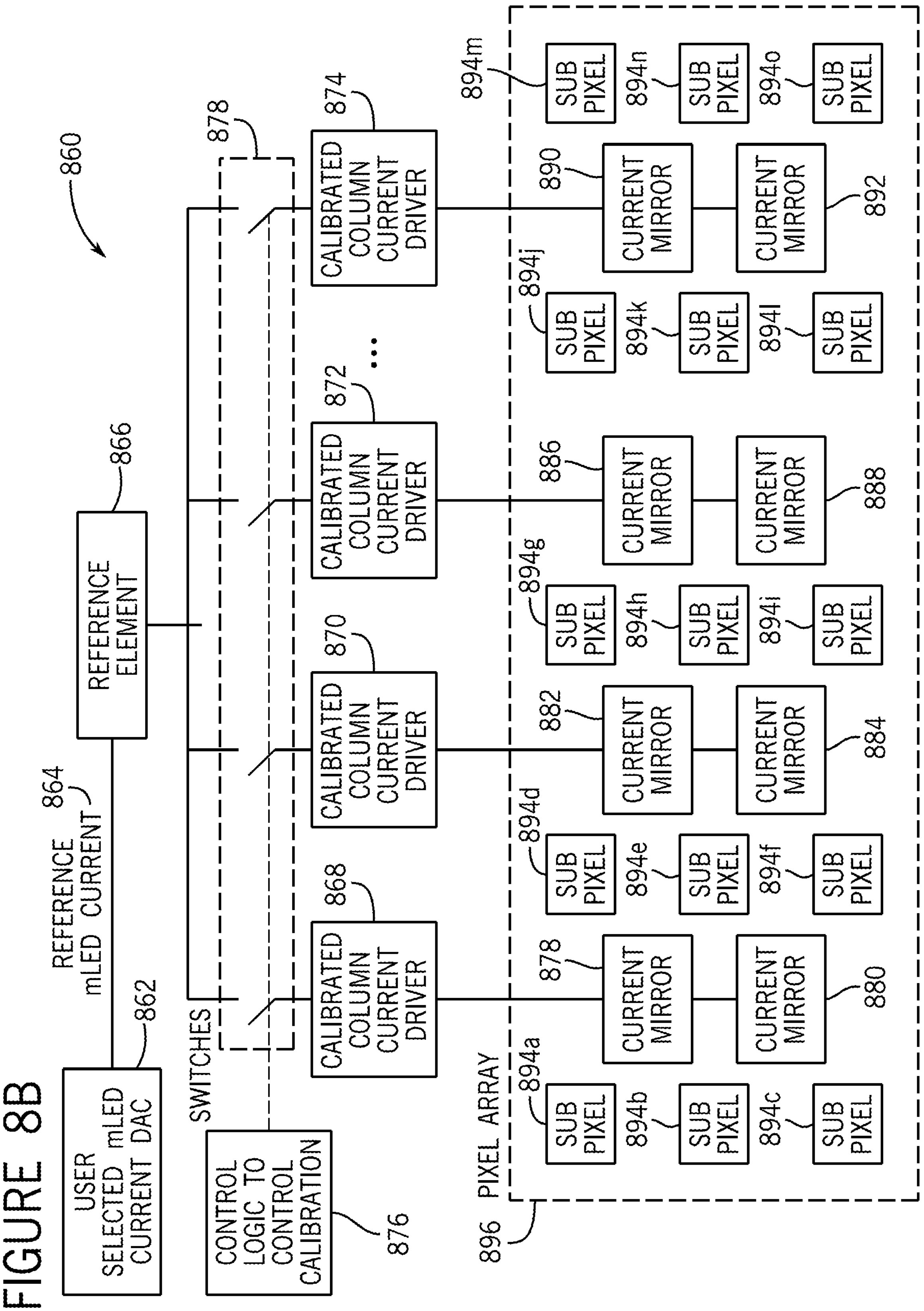
FIG. 8B illustrates distributing a reference current, according to embodiments of the invention.

FIG. 8B illustrates, generally at 860, distributing a reference current, according to embodiments of the invention. With reference to FIG. 8B, a Digital-to-Analogue converter (D/A) 862 changes the required digital codes into an accurate analogue reference current $I_o$ at 864. The column current drivers 868 through 874 drive a calibrated copy of the reference current $I_o$ onto a current mirror distribution network. The current mirror distribution network supplies the sub-pixel in the pixel array 896. Each one of the column current drivers 868, 870, 872, through 874 is an independent current source. The reference current 864 is first driven over a reference element 866. In various embodiments, the reference element 866 is a resistor. Each one of the column current drivers 868, 870, 872 through 874 is then calibrated against this reference on a round robin basis under the control of calibration control logic 876. The calibration control logic 876 connects a column current source to be calibrated (one of 868, 870, 872 through 874) to the reference element 866 using switches 878. The calibration process minimizes error in the final reference current delivered to a given sub-pixel. The reference current $I_o$ for the current mirrors 878, 880, 882, 884, 886, 888, 890, through 892 is produced by the column current drivers 868, 870, 872, through 874 calibrated to the D/A current 864 as described above. A series of current mirrors 878, 880, 882, 884, 886, 888, 890, through 892 then distribute the reference current across the pixel array 896 to the sub-pixels 894_a_, 894_b_, 894_c_, 894_d_, 894_e_, 894_f_, 894_g_, 894_h_, 894_i_, 894_j_, 894_k_, 894_l_, 894_m_, 894_n_, and 894_o_ using current mirrors 878, 880, 882, 884, 886, 888, 890, through 892 as shown in FIG. 8B.

With an accurate reference current $I_o$ now at each sub-pixel, the dynamic current mirror is used to set the gate source voltage needed to allow this amount of current to pass during illumination. This happens in two phases, as described above, and applies to both nmos and pmos transistors. In various embodiments, the mLED current control transistor is implemented in either pmos or nmos. The dynamic current mirror (FIG. 8A) is described herein using nmos transistors, merely for convenience, with no limitation implied thereby.

With reference to FIG. 8A at 800, during Phase 0, the upper switch 816 is in position Sy and is connected to the reference current $I_o$ distributed from the D/A at 802. Switch Sx at 818 is closed connecting the drain 808 of the transistor 806 to the gate 810 and the storage capacitor 814. The gate-source voltage required to pass the reference current $I_o$ will be developed across the capacitor 814 during Phase 0.

After the transistor 806 passes the required current $I_o$, the upper switch 816 position and the lower switch 818 positions are changed as shown in 850. The lower switch 818 is opened disconnecting the drain 808 from the gate 810 of the nmos transistor 806. The upper switch 816 is then moved into position 'Sz' connecting the mLED current transistor 806 to the mLED 804. The storage capacitor 814 will keep the gate 810 at the required voltage, thereby allowing an illumination $I_1$ at 852 to pass through the mLED 804, where $I_1=I_o$ as given by 854. Note that it is irrelevant what the actual voltage between the gate and the source is or what the transistor threshold voltage is now. This technique reduces the variance in pixel-to-pixel luminance caused by variations in transistor threshold voltage. The technique also takes into account the local supply voltage. As the dynamic capacitor 814 needs to be refreshed on a regular basis, for each illumination period, if the temperature changes, any resulting change in the transistor characteristics related to this are also compensated for.

In various embodiments, the dynamic current mirror can be implemented with nmos or pmos or other variants. No limitation is implied by the description given above using nmos.

In various embodiments, the storage capacitor can be replaced by a digital representation of the required voltage to avoid the dynamic refresh of the capacitor.

Figure 9:
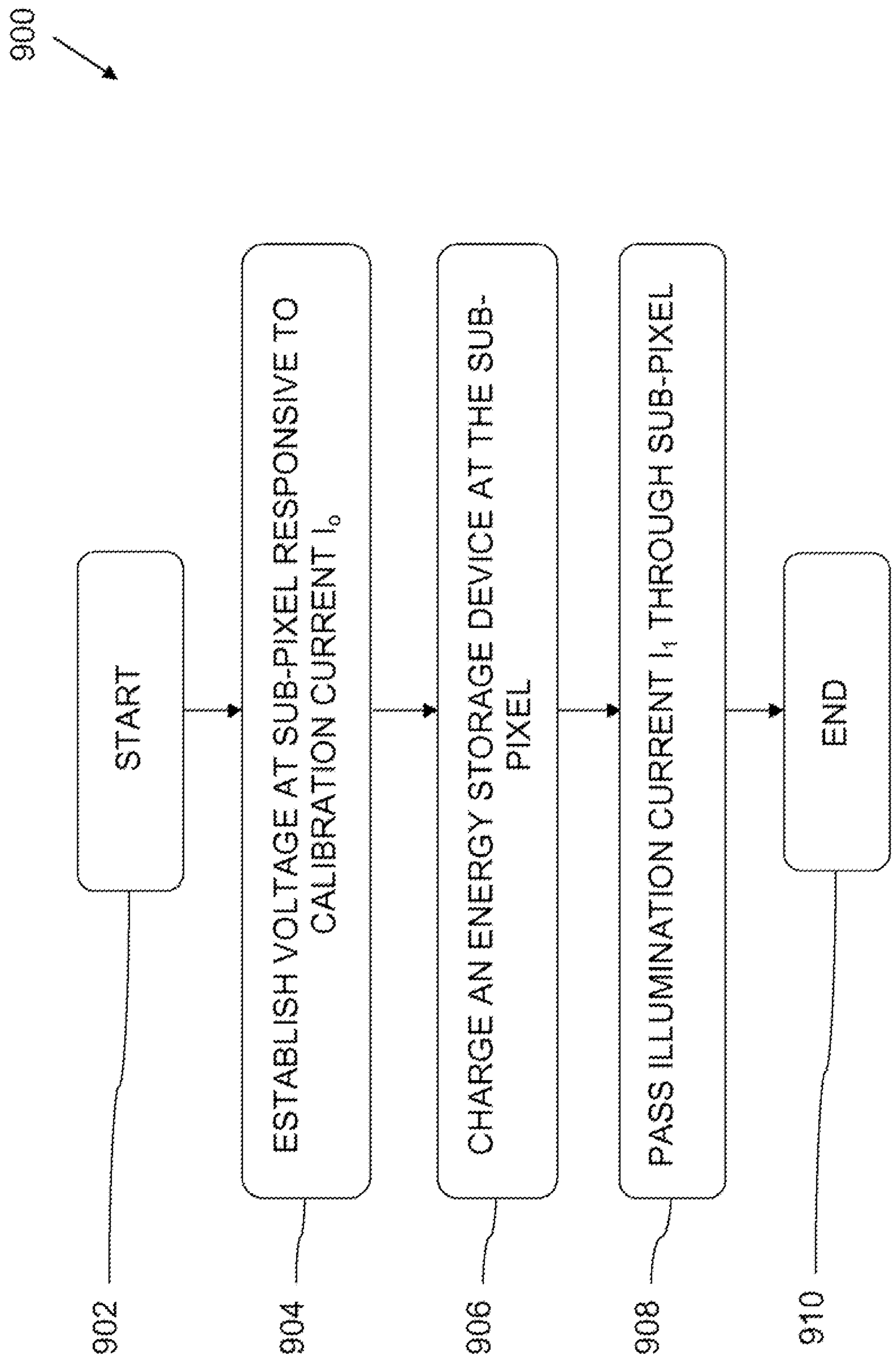
FIG. 9 illustrates a method of dynamic current mirror operation, according to embodiments of the invention.

FIG. 9 illustrates, generally at 900, a method of dynamic current mirror operation, according to embodiments of the invention. With reference to FIG. 9, a process starts at a block 902. At a block 904 a first voltage is established for a desired illumination of a sub-pixel mLED responsive to a calibration (reference) current $I_o$. At a block 906 an energy storage device at the sub-pixel is charged in response the first voltage. In various embodiments, Phase 0 operation of the dynamic current mirrors, described in the figures above, is used in the process at blocks 904 and 906. At a block 908 an illumination current $I_1$ is passed through the sub-pixel. In various embodiments, Phase 1 operation of the dynamic current mirrors, described above, is used in the process at block 908. The process stops at a block 910. The described process in FIG. 9 provides more uniform illumination from mLEDs in the mLED display. Any differences in transistor threshold voltage $V_{th}$ will not affect illumination from the mLEDs in the display because use of the reference current $I_o$ during Phase 0 produced a unique voltage on the energy storage device, a capacitor 814 in FIG. 8A, which will permit the same illumination current $I_1$ to flow through the mLED during the mLED ON state which occurs in Phase 1 of the dynamic current mirror operation.

Dynamic LED Characteristics and Measurement

Figure 10:
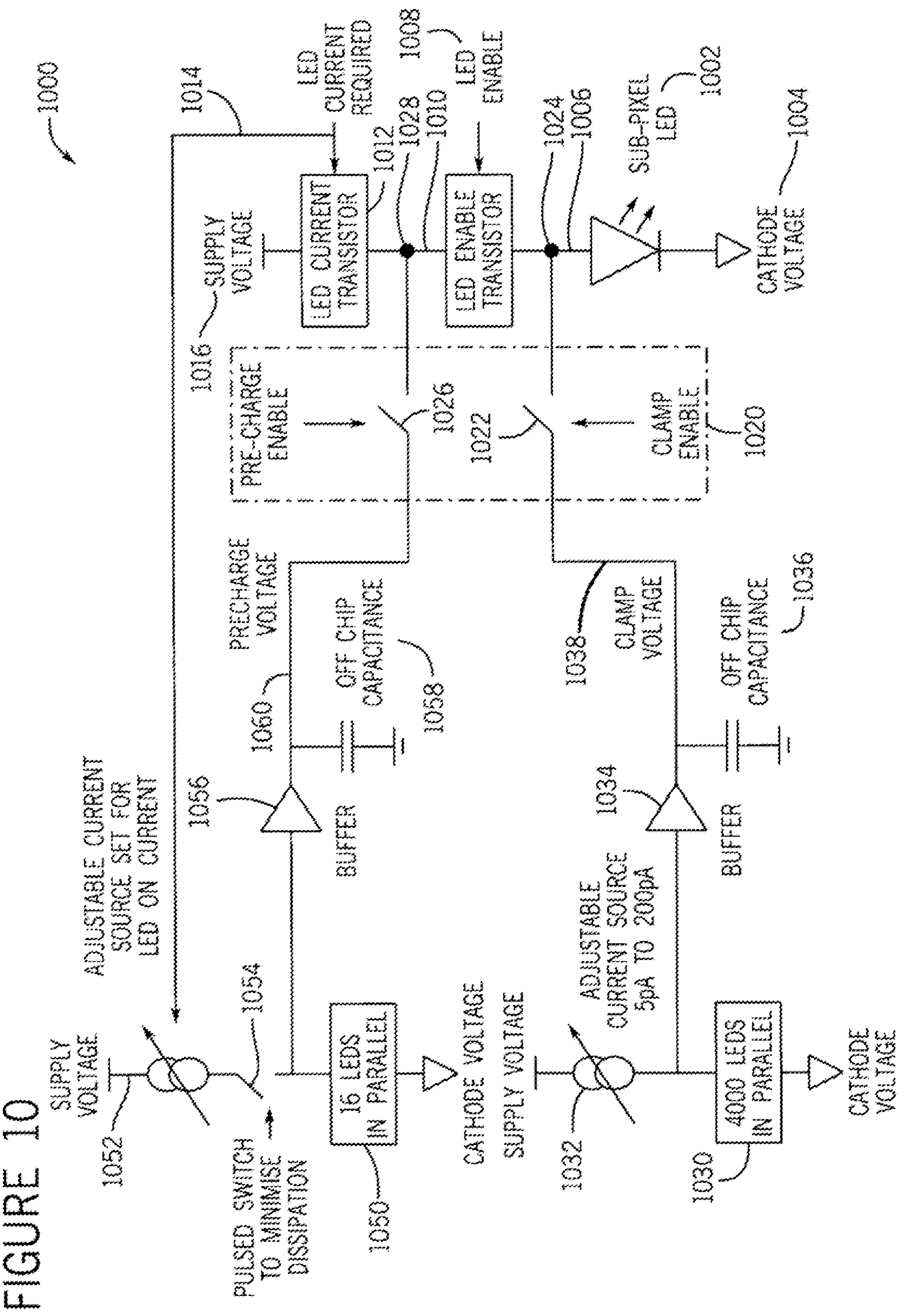
FIG. 10 illustrates sub-pixel drive circuit architecture, according to embodiments of the invention.

FIG. 10 illustrates, generally at 1000, sub-pixel drive circuit architecture, according to embodiments of the invention. With reference to FIG. 10, in various embodiments, in order to drive sub-pixel mLEDs at low luminance, circuits are used to minimize an amount of charge required to raise a forward voltage of a sub-pixel mLED high enough to pass the current while keeping the forward voltage just below the threshold to emit light. In various embodiments, the circuitry used is a combination of a pre-charge, clamp, and measurement circuitry.

While not being driven, in the OFF state, the ideal voltage to keep a sub-pixel mLED anode 1006 at to minimize switch-on time, is just below the 'knee' of the sub-pixel mLED current/voltage (IV) characteristic. This is referred to as a clamp voltage or a clamp anode voltage. At this point, the sub-pixel mLED may pass a small leakage current, but it is not enough to stimulate emission. This clamp point will vary between mLEDs. To keep the backplane of an mLED display generic, a measurement method is used to determine this clamp anode voltage. The measurement method utilizes a small current source 1032 to drive an adjustable current into a remotely located first set of mLEDs 1030. Measuring the forward voltage of the mLEDs when they are passing a small current can be difficult because the leakage current can be in the picoampere range which makes it difficult to accurately design and control the current sources used to drive them. In various embodiments, an array of mLEDs is used for this leakage current measurement method. In one or more embodiments, a non-limiting example given only for illustration and with no limitation implied thereby uses four thousand (4,000) mLEDs for the set at 1030. Through measurement, a maximum leakage current is obtained for the set at 1030 and the forward voltage relative to the cathode is then stored and is then used as the clamp voltage 1038. In some embodiments, this forward voltage is buffered at 1034 and stored on an off-chip capacitor at 1036. This clamp voltage 1038 is driven onto the anode of the mLEDs when an mLED is in an OFF state. A sub-pixel control module 1020 contains a switch 1022 that is closed during an mLED OFF state thereby driving the clamp voltage 1038 onto the anode 1006 at 1024.

When an mLED is switched to an ON state, the driving current may be too low to charge the mLED capacitance in a satisfactory time, thereby producing an incorrect emission that is too low, i.e., not bright enough. In some cases, provided only for illustration and with no limitation implied thereby, a small duration PWM level, for example grey level 1, might not last long enough to provide a visible emission of light from a mLED. To accomplish a fast switch-ON, and to remedy this problem, a pre-charge voltage 1060 is applied with a higher capacity current drive at the same time as enable transistor 1008 switches to an ON state. The "higher capacity current" is established with respect to an actual current required at the mLED sub-pixel. An example provided only for illustration, and with no limitation implied thereby, is a case where a PWM signal to a sub-pixel mLED requires 100 nanoamps (nA) at the sub-pixel. A pre-charge current can be used that provides approximately 2 microamps (uA), thereby quickly charging the capacitance in the sub-pixel mLED to the forward voltage required to pass the 100 nA. The 2uA can be supplied in various ways by for example a buffer 1056 or a buffer 1034 directly into each row of the mLED display.

The pre-charge voltage 1060 is derived from measurements of a remotely located set of mLEDs 1050. The required driving current necessary to place the mLEDs in the ON state, at a brightness set by a user, is pulsed via switch 1054 into the remote mLEDs 1050 using a current source 1052. The forward voltage required to pass this current is sampled and stored. In some embodiments, this forward voltage is buffered at 1056 and stored on an off-chip capacitor at 1058. In various embodiments, a number of mLEDs in the remote set 1050 is large enough to obtain an acceptable average over the variability arising from manufacturing tolerance. In one or more embodiments, a non-limiting example given only for illustration and with no limitation implied thereby uses 16 mLEDs for the set 1050. This number provides enough mLEDs for the purpose of redundancy, while not wasting energy. In some embodiments, the set 1050 is covered with a metal layer to prevent emission of light.

When the mLED 1002 is switched to the ON state, the value of the pre-charge voltage 1060 required to pass this current is driven onto the anode of the mLED using a high current supply, which quickly charges the mLED capacitance and allows a fast turn-ON of the mLED 1002. Once charged, the pre-charge current pulse is switched off. The sub-pixel control module 1020 contains a switch 1026 that is closed at the beginning of the mLED ON state thereby driving the pre-charge voltage 1060 onto the anode 1006 via 1028.

As shown in FIG. 10, a mLED current transistor 1012 receives a supply voltage 1016 and a drive current 1014. An output of the mLED current transistor 1012 is input at 1010 into a mLED enable transistor 1008. An output of the mLED enable transistor 1008 is coupled to the anode 1006 of the sub-pixel mLED 1002.

Figure 11:
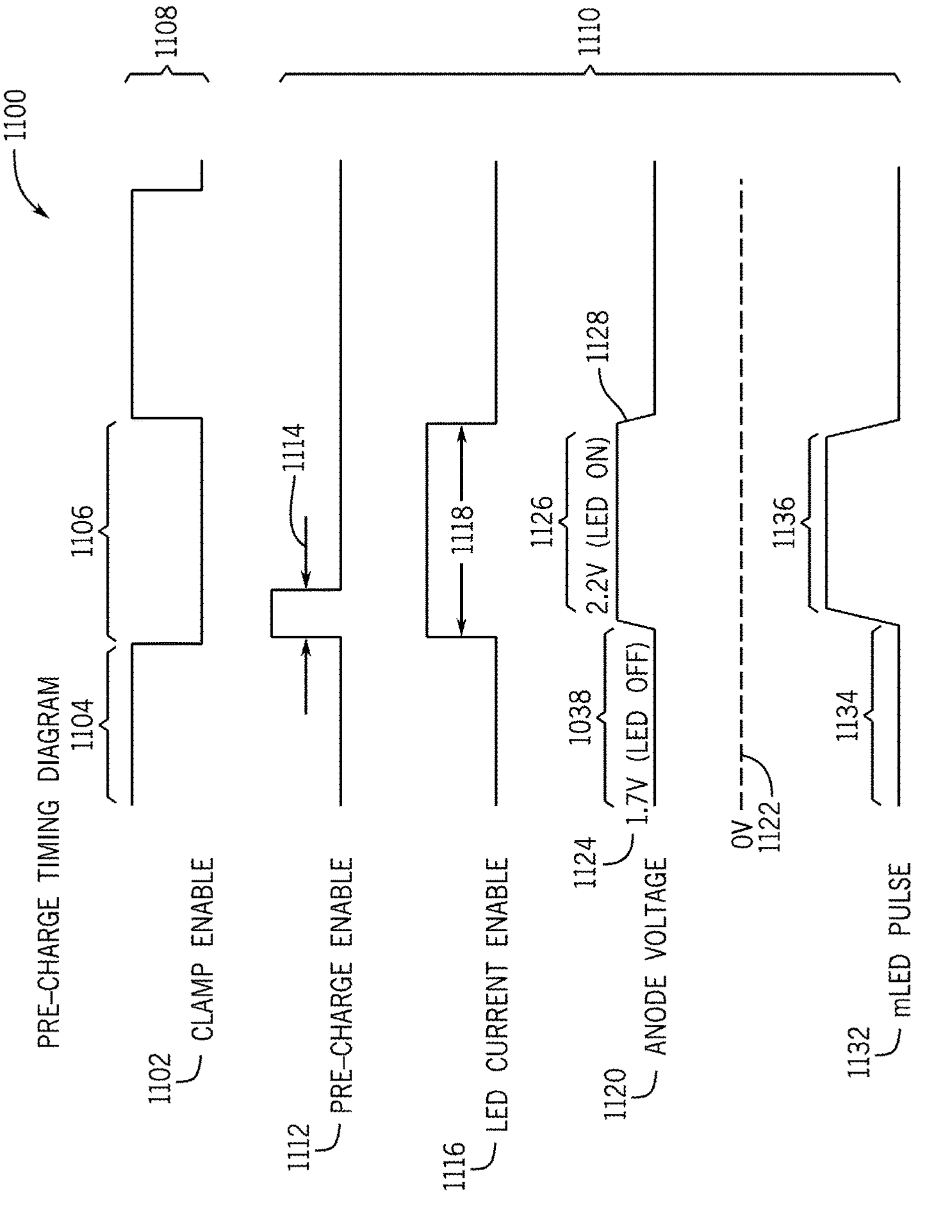
FIG. 11 illustrates, a timing diagram, according to embodiments of the invention.

FIG. 11 illustrates, generally at 1100, a timing diagram, according to embodiments of the invention. With reference to FIG. 11, non-limiting examples are illustrated of the timing between the signals used in the schematic shown in FIG. 10. Note that during a sub-pixel mLED OFF state, the clamp enable 1102 signal is high as shown at 1104 and is low as shown at 1106. 1108 indicates that only the clamp enable 1102 signal is high during the OFF state. The other signals are high during the ON state as indicated by a bracket 1110.

The anode voltage 1120 represents the voltage on the anode 1006 of the sub-pixel mLED 1002. It can be seen that when the mLED current enable signal 1116 is low (OFF), the clamp enable signal 1102 is high (ON), which holds the anode voltage 1120 at the derived clamp voltage 1038 and keeps the mLED 1002 from emitting light during the OFF state. In this example, given only for illustration and with no limitation implied thereby, the clamp voltage 1038 is 1.7 volts (V) above the cathode voltage of zero (0) volts, the cathode voltage is indicated at 1122. When the mLED current enable signal 1116 is switched ON during 1118, the pre-charge enable signal 1112 is also switched ON for a programmable period of time 1114. This charges the mLED anode 1006 up to the measurement derived pre-charge voltage 1128. In this non-limiting example, the pre-charge voltage, indicated at 1128, is 2.2V above the cathode voltage, the cathode voltage is indicated at 1122. The mLED pulse waveform 1132 represents luminance from the mLED 1002. During 1134 there is no illumination, while at 1136 there is illumination. During 1134 voltage 1124 is maintained during time period 1038. During 1136 voltage 1128 is maintained during time period 1126.

Note that in various embodiments, various numbers of remote mLEDs can be used for pre-charge measurements at 1050 or clamp measurements at 1030. As used in this description of embodiments, "remote" mLEDs means mLEDs that are not part of an mLED display.

In yet other embodiments, a pre-charge voltage can be directly applied to the mLED anode at 1006.

In some embodiments, a clamp voltage can be a negative voltage rather than being limited to zero (0) volts as shown in the example illustrated in the figures.

In some embodiments, the buffer 1034 or 1056 can be an amplifier to provide gain.

In some embodiments, the current source 1032 and or 1052 contains a memory element to allow for a calibration which is retained after a power cycle.

In some embodiments, off chip capacitance 1036 and or 1058 can be on chip as well.

In some embodiments, pre-charge voltage doesn't have to be pulsed and can be constant.

In some embodiments, the pre-charge voltage can be used as a feedback signal to optimize the cathode voltage 1004 of the mLED. By using an on-chip measurement device, the pre-charge voltage can be measured and then fed back to a control circuit. The control circuit would optimize the cathode voltage of the mLED to minimize power dissipation.

Figure 12:
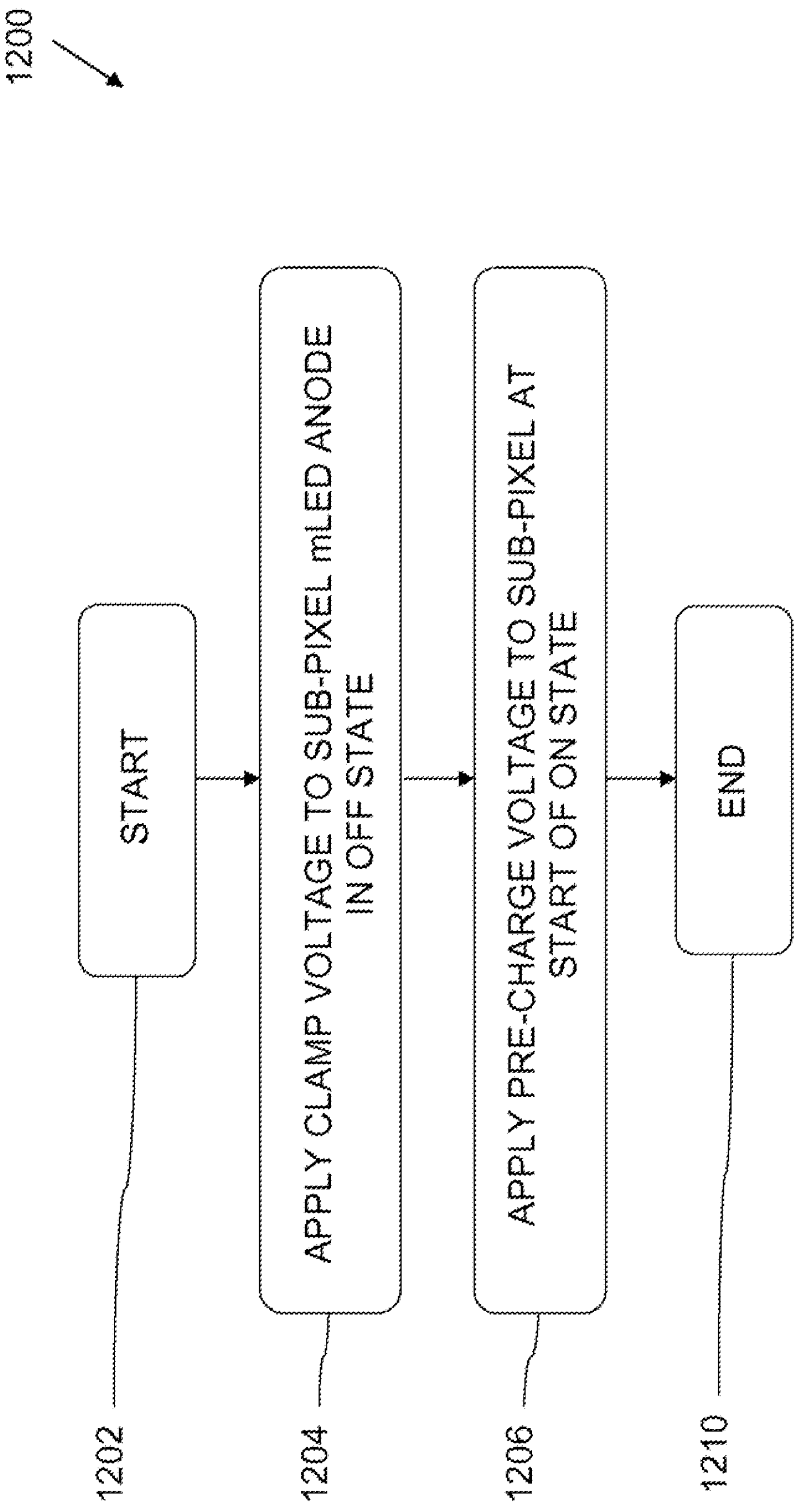
FIG. 12 illustrates a method of operating a sub-pixel, according to embodiments of the invention.

FIG. 12 illustrates, generally at 1200, a method of operating a sub-pixel, according to embodiments of the invention. With reference to FIG. 12, a process starts at a block 1202. At a block 1204 a clamp voltage is applied to an anode of a sub-pixel mLED during an OFF state. At a block 1206 a pre-charge voltage is applied for a period of time to the anode of the sub-pixel mLED during an ON state. The process ends at a block 1208. The process of FIG. 12 is repeated for all sub-pixels in the mLED display during the display of image data. The process facilitates fast switch-on of the sub-pixel mLEDs. The process of FIG. 12 prevents short duration PWM pulses from being dissipated through charging parasitic capacitance associated with a mLED without providing emission of light.

Figure 13:
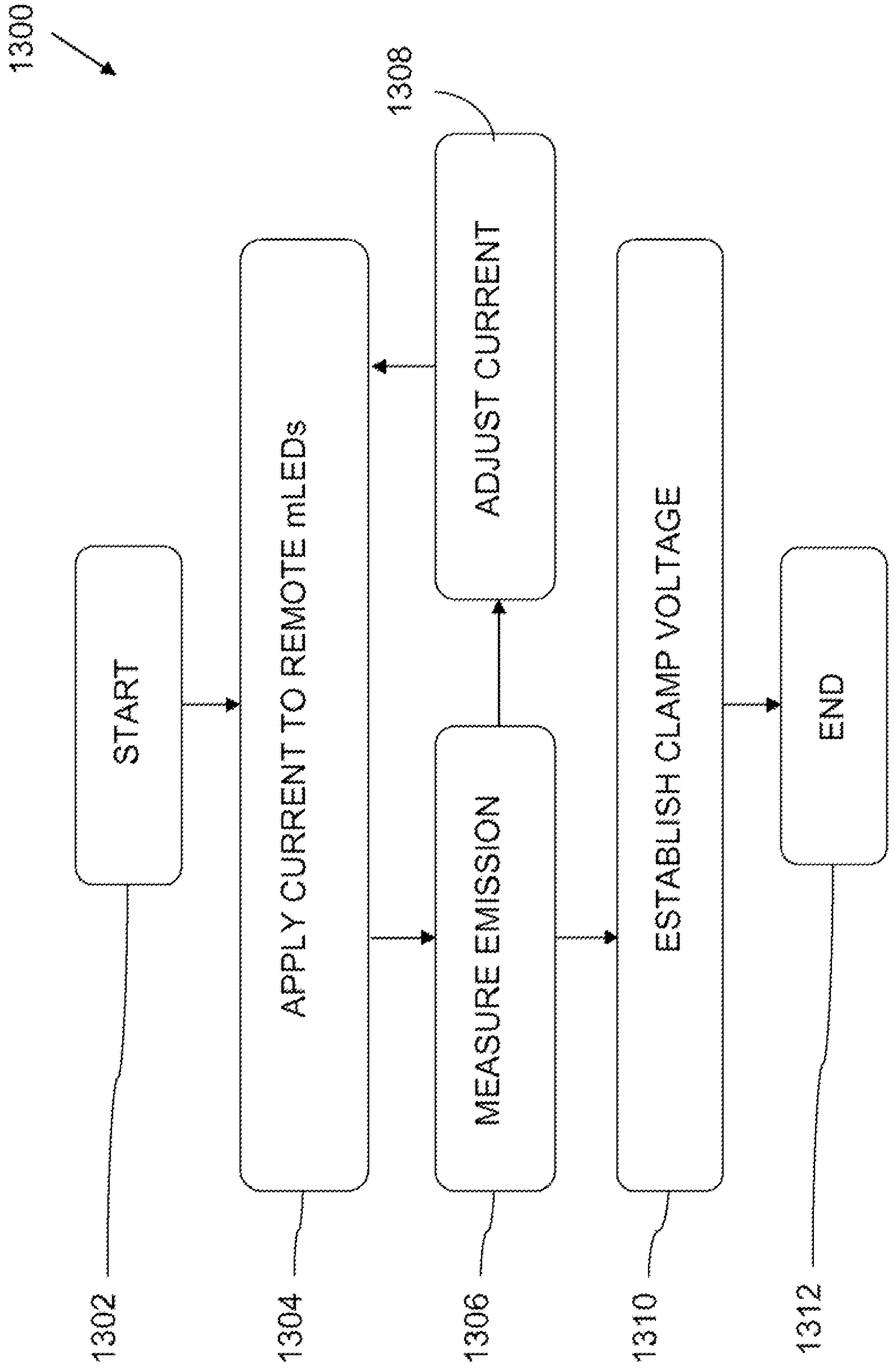
FIG. 13 illustrates a method to obtain a clamp voltage for a sub-pixel, according to embodiments of the invention.

FIG. 13 illustrates, generally at 1300, a method to obtain a clamp voltage for a sub-pixel, according to embodiments of the invention. With reference to FIG. 13, a process starts at a block 1302. At a block 1304 an adjustable current is applied to a first set of remote mLEDs. In various embodiments, given only as an example and with no limitation implied thereby, the adjustable current is in a range of 5 picoamperes (pA) to 200 picoamperes (pA). In various embodiments, the first set of remote mLEDs can be a set of 4,000 mLEDs. In other embodiments, there can be more than 4,000 or less than 4,000 mLEDs in the first set. In some embodiments, the number of mLEDs is selected to account for mLEDs that might have a lower threshold at which emission of light is stimulated. It is generally desirable to prevent emission of light when a clamp voltage is applied.

At a block 1306 mLED emission is measured. At a block 1308 current supplied to the set of mLEDs is adjusted. At a block 1310 the mLED clamp voltage is established that corresponds to a maximum leakage current that does not stimulate emission of light from the set of mLEDs. The process stops at a block 1312.

Figure 14:
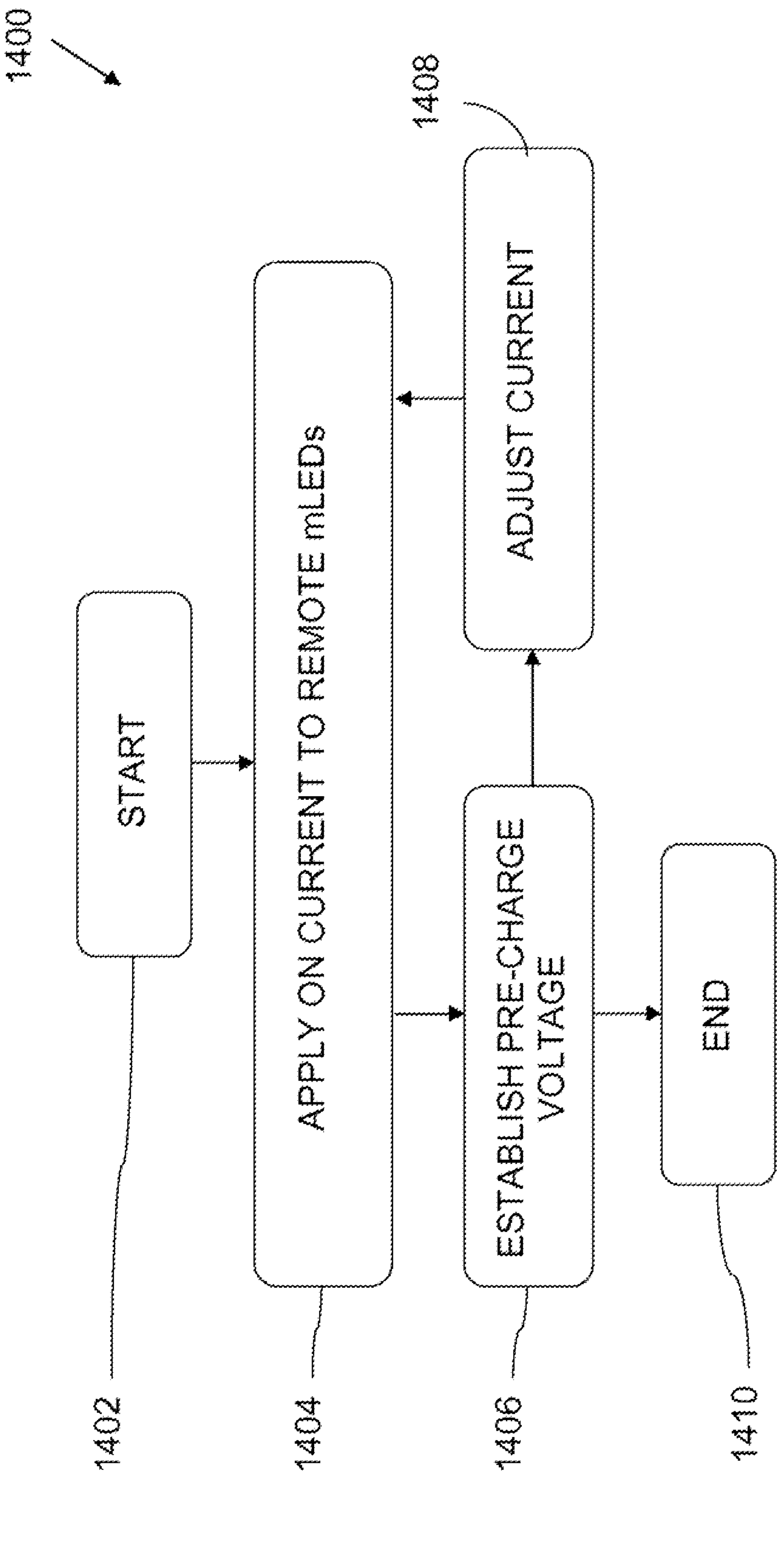
FIG. 14 illustrates a method to obtain a pre-charge voltage for a sub-pixel, according to embodiments of the invention.

FIG. 14 illustrates, generally at 1400, a method to obtain a pre-charge voltage for a sub-pixel, according to embodiments of the invention. With reference to FIG. 14, a process starts at a block 1402. At a block 1404 a current sufficient to turn a second set of mLEDs to an ON state is applied to the mLEDs in the second set. At a block 1408 the drive current is adjusted. At a block 1406 the pre-charge voltage is established. The process stops at a block 1410. In various embodiments, the second set of remote mLEDs can be a set of 16 mLEDs. In other embodiments, there can be more than 16 or less than 16 mLEDs in the second set. In some embodiments, the current is applied at 1404 with a pulsed switch to minimize dissipation.

In various embodiments, the components of the mLED backplane architectures, described in the previous figures, are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the embodiments of the present invention. It will be evident, however, to one of ordinary skill in the art that embodiments of the present invention may be practiced without these specific details. In some instances, well-known structures and devices are shown in block diagram form, rather than in detail, in order to avoid obscuring embodiments of the present invention. These embodiments are described in sufficient detail to enable those of ordinary skill in the art to practice the invention, and it is to be understood that other embodiments may be utilized and that logical, mechanical, electrical, and other changes may be made without departing from the scope of embodiments of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. In other examples, embodiments of the invention as described in the figures herein can be implemented using a system on a chip (SOC), a Bluetooth chip, a digital signal processing (DSP) chip, a codec with integrated circuits (ICs) or in other implementations of hardware and software.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus, embodiments of the invention are used to provide improvements in mLED apparatuses, systems, and methods such as are used in mLED displays. Some non-limiting examples of mLED displays where embodiments of the invention are used are, but are not limited to; mobile phones, use in a near-to-eye (NTE) display or a headset computing device. Various embodiments of the invention are readily implemented in a wearable or a head wearable device of general configuration, such as but not limited to; wearable products such as virtual reality (VR), augmented reality (AR), mixed reality (MR); wristband, watch, glasses, goggles, a visor, a head band, a helmet, etc. or the like. As used in this description of embodiments, wearable encompasses, head wearable, wrist wearable, neck wearable, thus any form of wearable that can be applied to a user.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A method to display image data to a sub-pixel within a micro-LED (mLED) display, comprising:

storing a sub-pixel image data value at the sub-pixel;

turning the sub-pixel to an ON state;

providing a shared row counter value to the sub-pixel;

comparing the shared row counter value and the sub-pixel image data value; and turning the sub-pixel to an OFF state if the shared row counter value is equal to or greater than the sub-pixel image data value wherein the sub-pixel image data value is encoded and the shared row counter value is encoded, gamma correction is encoded into sub-pixel image data and the gamma correction is related to a count frequency associated with sub-pixel image data.

2. A computer-readable storage medium storing program code for causing a data processing system to perform the steps comprising:

storing a sub-pixel image data value at a sub-pixel;

turning the sub-pixel to an ON state;

providing a shared row counter value to the sub-pixel;

comparing the shared row counter value and the sub-pixel image data value; and turning the sub-pixel to an OFF state if the shared row counter value is equal to or greater than the sub-pixel image data value, wherein the sub-pixel image data value is encoded and the shared row counter value is encoded, gamma correction is encoded into sub-pixel image data and the gamma correction is related to a count frequency associated with the sub-pixel image data.

* * * * *